UNITED STATES PATENT OFFICE.

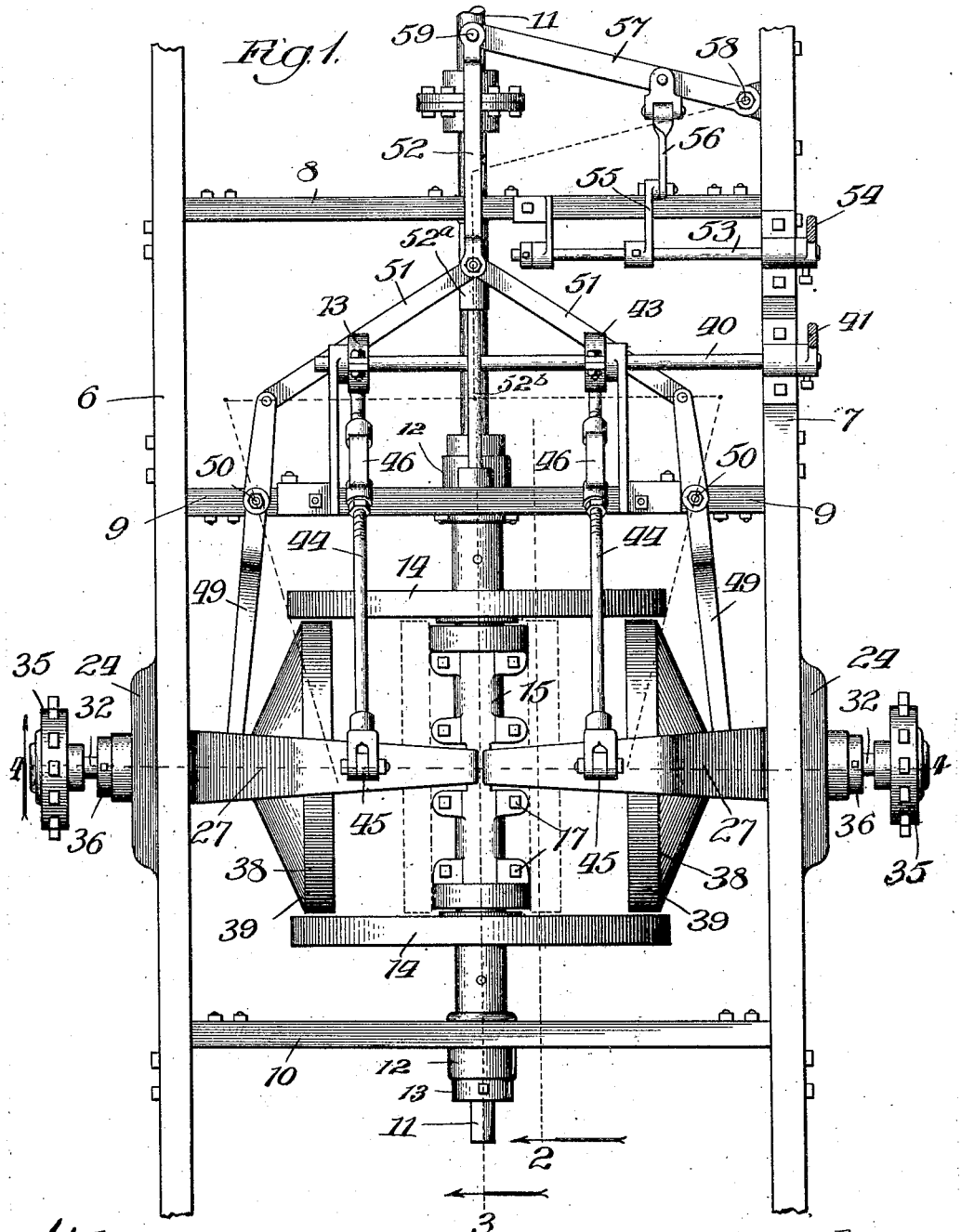

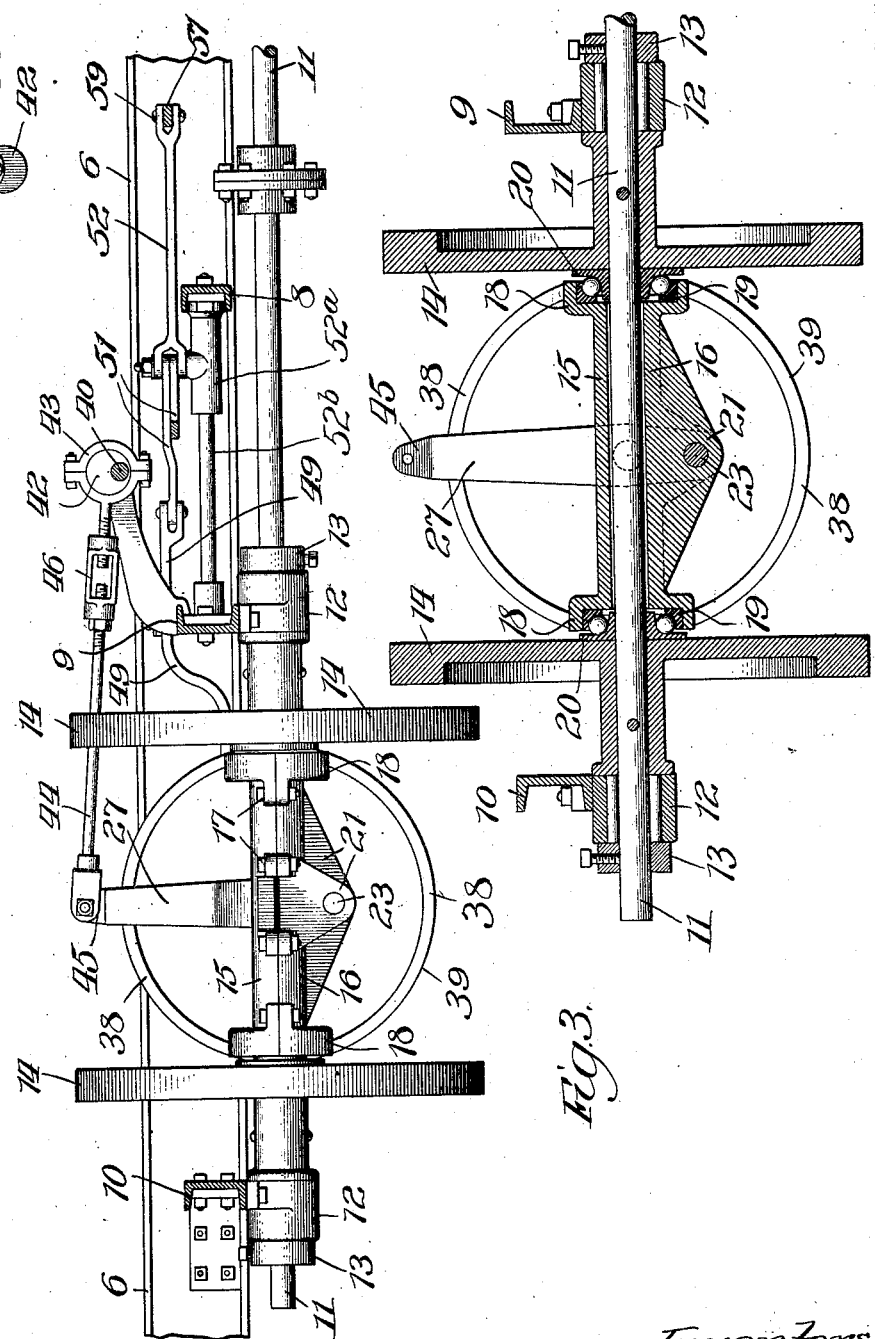

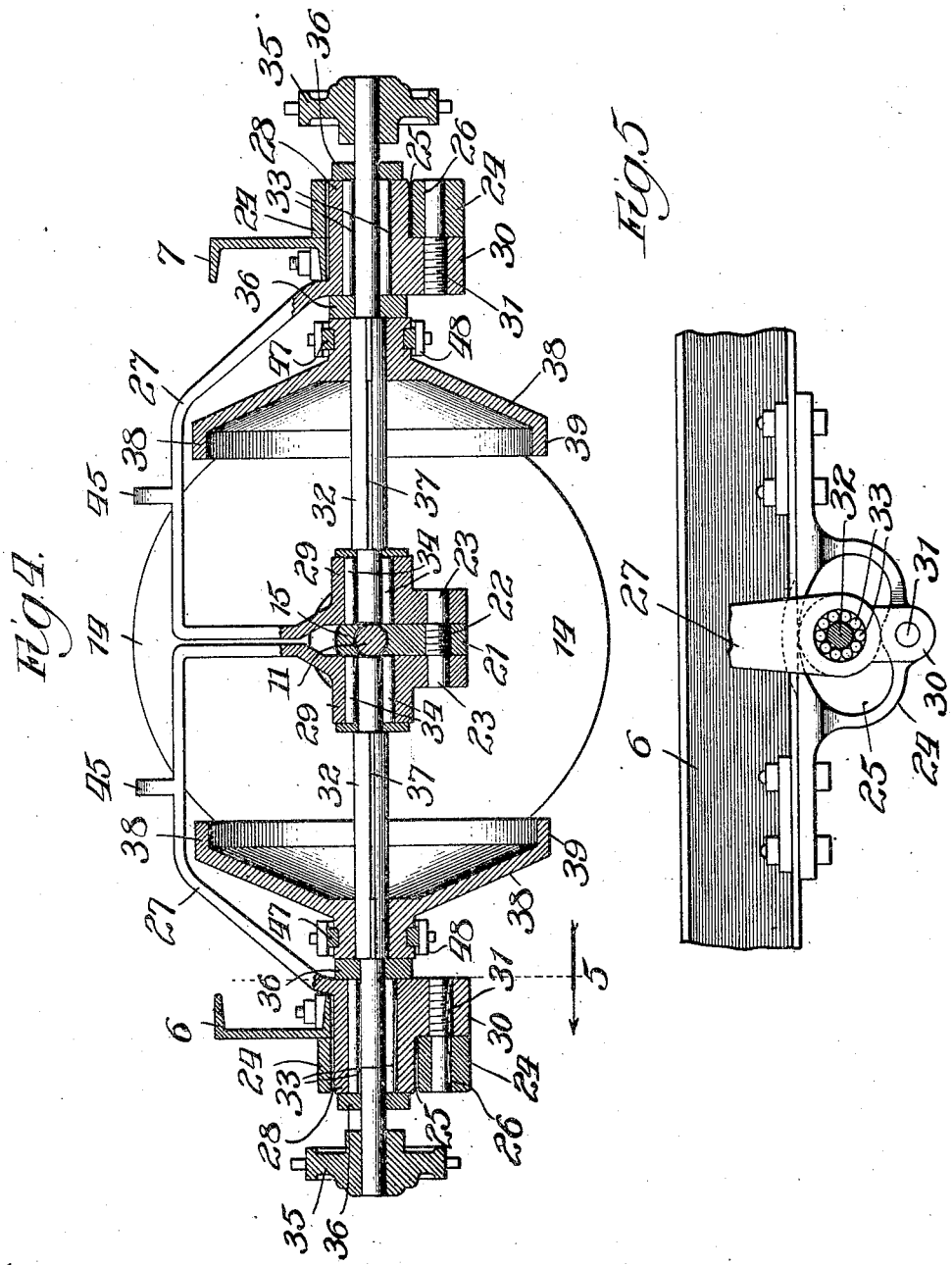

WILLIAM R. DONALDSON AND GEORGE W. MARBLE, OF CHICAGO, ILLINOIS.

POWER-TRANSMISSION MECHANISM.

No. 906,118.  Specification of Letters Patent.  Patented Dec. 8, 1908.

Application filed September 24, 1906. Serial No. 336,009.

*To all whom it may concern:*

Be it known that we, WILLIAM R. DONALDSON and GEORGE W. MARBLE, citizens of the United States, residing at Chicago, in the county of Cook and State of Illinois, have invented a new and useful Improvement in Power-Transmission Mechanism, of which the following is a specification.

Our invention relates to improvement in the construction of double rolling traction power-transmission mechanism for automobiles, or the like, more especially of the type employing internal combustion, or other, prime movers which for power efficiency are operated at constant speed. For convenience, in the application of this type of transmission-mechanism to automobiles, confronting driving disks are mounted on the propeller shaft and adjustable, speed-changing driven rollers are mounted between the disks on separate laterally adjustable driven shafts, means being provided for moving the driven shafts laterally to throw the rollers into and out of engagement with the disks, and means being provided for moving the rollers coincidently toward and away from the center of rotation of the propeller shaft to change the transmitted speed. The said driven shafts carry sprocket-wheels which are geared by means of drive-chains to the traction wheels of the vehicle. It has been usual, hitherto, to journal the driven shafts near their outer ends in fixed bearings and to cause the shafts to vibrate on their bearings in moving the rollers into and out of engagement with the driving disks. This construction, however, has been found to be objectional in practice, because among other reasons, the changes in angle of the vibratory shafts throw the sprocket-wheels out of direct line with the chains they are driving, which results in making the transmission unduly noisy and is, for other obvious reasons, undesirable; and because any wear upon the peripheries of the rollers and faces of the disks, causes the rollers to extend out of perpendicular with the faces of the disks, while engaging the same, resulting in unequal wear of the traction surfaces.

Our object is to provide adjusting-mechanism for the rollers which shall be free from the above noted, and other, objections; and it is also our object to provide various improvements in details of the said adjusting-mechanism, for the purpose of simplifying and cheapening the construction and rendering it particularly responsive, strong, durable and desirable for its purpose.

Referring to the accompanying drawings, Figure 1 is a broken, partly sectional, plan view showing our improvements in operative position and in the form in which we now prefer to provide them; Fig. 2, a broken longitudinal section taken on line 2 in Fig. 1 with the disks in elevation; Fig. 2ª, a section of a rock shaft illustrating, merely, the relative positions of eccentric disks carried thereby; Fig. 3, an enlarged section taken on line 3 in Fig. 1; Fig. 4, an enlarged cross section taken on line 4 in Fig. 1; and Fig. 5, a sectional fragmentary view taken on line 5 in Fig. 4.

6 and 7 are the side beams and 8, 9, and 10 cross braces forming parts of an automobile under-frame. The propeller shaft, 11, is journaled in roller-bearing boxes, 12, bolted against the cross braces of the frame, and is held against longitudinal play by means of collars, 13, as indicated. Fastened to the shaft, 11, between the braces, 9 and 10, are confronting disks, 14, 14, formed with suitable friction faces.

15 and 16 are the upper and lower members, respectively, of a horizontally split sleeve loosely surrounding the propeller shaft, 11, and fastened together by means of bolts, 17, as indicated. The opposite end portions of the sleeve are shaped into ball-bearing cups, 18, and contain outer race-member rings, 19. Fastened to the shaft, against the inner faces of the disks, 14, are bearing cones, or inner ball-race members, 20, balls being confined between the race members whereby the shaft rotates freely in the said surrounding sleeve. Midway between the disks, 14, the upper and lower members, 15, 16, of the sleeve, are reduced to a thickness approximating the diameter of the propeller shaft, 11, as indicated in Fig. 4. Integral with the under side of the sleeve section, 16, is a narrow web, 21, provided with a threaded opening, 22.

23 is a bearing-pin provided at its center with a thread to engage the threaded opening, 22, and projecting from the opposite sides of the web as shown.

Fastened against the under sides of the side beams, 6 and 7, are bearing brackets, 24, formed with large openings, 25, and small bearing openings, 26, in the relative positions indicated in Fig. 5. The openings, 26, are in direct line with the opening, 22, in the web described.

27, 27 are similar yoke-frames, each provided at its outer end with a sleeve, 28 and at its inner end with a sleeve, 29. The sleeves, 28, are provided with downward-projecting ears, 30, having threaded openings through them to receive the threaded end-portions of bearing-pins, 31, which are journaled in the openings, 26, of the brackets, 24.

32, 32 are driven shafts journaled toward their outer ends in roller-bearings, 33, in the sleeves, 28, and journaled at their inner ends in roller-bearings, 34, in the sleeves, 29. Each of the shafts, 32, is provided beyond its bearing, 33, with a sprocket-wheel, 35, and is held against longitudinal play in its supporting-yoke by inner and outer collars, 36, which rotate against opposite ends of the sleeves, 28. Each shaft is provided, between its journal bearings, with a longitudinal groove, or key-way, 37. On each shaft, 32, is a dished driven-wheel, or roller, 38, having a circumferential traction surface, 39. The rollers are feathered to the grooves, 37, and may be slid longitudinally of their shafts. Journaled in the frame, in the position shown, is a rock-shaft, 40, having an operating lever, 41, beyond the side beam, 7. The shaft, 40, carries two oppositely projecting eccentric disks, 42, as indicated in Fig. 2ª. On the disks, 42, are eccentric rings, 43, each pivotally connected by a rod, 44, with a lug, 45, carried by the respective yoke-frame. Interposed in the rods, 44, are turnbuckles, 46, whereby they may be lengthened or shortened for adjustment. As shown, one rod, 44, forms a connection between one eccentric disk, 42, and one yoke-frame, 27, while the other rod, 44, forms a connection between the other eccentric disk and the other yoke-frame.

In practice the rollers, 38, are but slightly less in diameter than the distance between the faces of the friction disks, 14. Rocking of the shaft, 40, in one direction, vibrates the yokes simultaneously in opposite directions on their fulcrums, 23, 26, whereby the shafts, 37 are moved through their lengths bodily in opposite directions. Thus in the movement of the lever, 41, in one direction, one roller, 38, will be moved into contact with one disk, 14, and the other roller, 38, with the other disk, 14, causing the shafts, 32, and their sprocket-wheels, 35, to be rotated simultaneously in the same direction. Movement of the lever, 41, in the contrary direction disengages the rollers simultaneously from the disks, while still further movement causes the rollers to engage the opposite disks and rotate the driven shafts and their sprocket-wheels in the opposite direction. In the swinging of the yokes the shafts are maintained at all times in exact parallelism with the faces of the disks, 14, and the angles of the rollers, 38, with reference to the disks, and all the sprocket-wheels with reference to their drive chains, never change. This insures perfect frictional contact of the roller faces, 39, with the disk faces. With the movement of the sprocket-wheels slight relaxing and tensioning of the drive chains occurs, but the distance of movement is so slight as to render this action immaterial.

In grooves on the hubs of the rollers, 38, are rings, 47, pivotally engaged by the bifurcated ends, 48, of levers, 49, fulcrumed at 50. Links, 51, connect the short arms of the levers, 49, with a longitudinally sliding bar, 52, connected with a sleeve 52ª sliding on a guide-rod 52ᵇ. A rock-shaft, 53, carries an operating lever, 54, and a crank, 55, which latter is pivotally connected by means of a link, 56, with a lever, 57. The lever, 57, is fulcrumed to the side-beam, 7, at 58 and is pivotally connected at 59 with the end of the bar, 52. Turning of the lever, 54, in one direction causes the lever, 57, to move the bar, 52, and through it the links, 51, and swing the levers, 49, at their long arms in the direction of each other and slide the rollers simultaneously and equally toward the center of rotation of the shaft 11. Movement of the operating lever, 54, in the other direction from that stated, has the effect of sliding the rollers simultaneously away from each other. Thus the rollers may be caused, when high speed is desired, to engage the disks near the peripheries of the latter; and the shape of the rollers permits them to be moved at their peripheries, for slow speed, close to the center of rotation of the disks, their dished centers clearing the sleeve-portions, 29, of the yokes. Owing to the system of leverage, shown and described, comparatively slight swinging movement of the lever, 54, is necessary to shift the rollers between the positions of highest and lowest speed-transmission.

The operating mechanisms for throwing the rollers into and out of engagement with the disks and for effecting change in speed-transmission, consist of comparatively few parts, all of which are of particularly strong and durable construction. They work without any material lost motion and are particularly free from danger of wear.

Our improvements, in their broadest sense, may be applied to traction power-transmission devices of the single as well as double rolling type, and they may be employed in other connections than automobiles. If desired the fulcrums of the rocking-frames, or yokes, may be at the upper, instead of the lower, side of the shaft which carries the disks, thereby changing the character of the frames, or yokes, from levers of the second to levers of the first order. These and other changes in the details of construction may, obviously, be made without departing from the spirit of the invention as defined by the claims.

What we claim as new and desire to secure by Letters Patent is—

1. In a double rolling power-transmitting mechanism, the combination of a shaft, two parallel disks thereon having confronting friction faces, rocking frames extending transversely of and between the disks and each fulcrumed to one side of the plane of said shaft, bearings on the frames, a transverse shaft journaled in the said bearings of each of said frames, a roller on each of said transverse shafts, between the disks, having a peripheral friction surface, and means for rocking said frames on their fulcrums simultaneously in opposite directions to move the rollers into and out of frictional engagement with the disks and maintain the parallelism of the transverse shafts and disk-faces.

2. In a double rolling power-transmitting mechanism, the combination of a main frame, a shaft journaled therein, two parallel disks on the shaft having confronting friction faces, a sleeve surrounding the shaft between the disks, rocking frames extending transversely of and between the disks and fulcrumed upon the said sleeve, bearings on the frames, a transverse shaft journaled in the said bearings of each of said rocking frames, a roller on each of said transverse shafts, between the said disks, having a peripheral friction surface, and means for rocking said frames on their fulcrums simultaneously in opposite directions, to move the rollers into and out of frictional engagement with the disks and maintain the parallelism of the transverse shafts and disk-faces.

3. In a double rolling power-transmitting mechanism, the combination of a main frame, a shaft journaled therein, two parallel disks on the shaft having confronting friction faces, a sleeve surrounding the shaft between the disks, rocking frames extending transversely of and between the disks and fulcrumed at their adjacent ends upon said sleeve and at their opposite ends in the said main-frame, bearings on the frames, a transverse shaft journaled in the said bearings of each of said rocking frames, a roller on each of said transverse shafts, between the said disks, having a peripheral friction surface, and means for rocking said frames on their fulcrums, simultaneously in opposite directions, to move the rollers into and out of frictional engagement with the disks and maintain parallelism of the transverse shafts and disk-faces.

4. In a double rolling power-transmission mechanism the combination of a main-frame, a shaft journaled therein, two parallel disks on the shaft having confronting friction faces, a sleeve surrounding said shaft between the disks, rocking frames extending transversely of and between the disks and fulcrumed at their adjacent ends upon the said sleeve and at their opposite ends in said main-frame, anti-friction bearings between the said sleeve and shaft, bearings on the frames, a transverse shaft journaled in the said bearings of each of said frames, a roller on each of said transverse shafts, between said disks, having a peripheral friction surface, and means for rocking said frames on their fulcrums simultaneously in opposite directions to move the rollers into and out of frictional engagement with the disks and maintain parallelism of the transverse shafts and disk-faces.

5. In a double rolling power-transmitting mechanism, the combination of a main frame, a shaft journaled therein, two parallel disks upon the shaft having confronting friction-faces, a sleeve surrounding the shaft between the disks, rocking frames extending transversely of and between the disks and fulcrumed at their adjacent ends upon the said sleeve and at their opposite ends in said main-frame, inner and outer anti-friction bearings in each rocking frame, a transverse shaft on each rocking frame journaled toward opposite ends respectively in said anti-friction bearings, a roller on each of said transverse shafts, between the said disks, having a peripheral friction surface, and means for rocking said frames on their fulcrums simultaneously in opposite directions, to move the rollers into and out of frictional engagement with the disks and maintain parallelism of the shafts and disk-faces.

6. In a double rolling power-transmitting mechanism, the combination of a shaft, two parallel disks thereon having confronting friction-faces, rocking frames extending transversely of and between the disks and each fulcrumed to one side of the plane of said shaft, bearings on the frames, a transverse shaft journaled in said bearings of each of said frames, a roller on each of said transverse shafts, between the said disks, having a peripheral friction-surface, a rock-shaft provided with a pair of oppositely extending eccentrics operatively connected respectively with said rocking-frames and rocking means for the said rock-shaft.

7. In a double rolling power-transmitting mechanism, the combination of two parallel disks having confronting friction-faces, two transverse shafts between and parallel with said disk-faces, a roller on each of said transverse shafts disposed respectively on opposite sides of the center of rotation of said disks, means for shifting the rollers on their shafts simultaneously toward and away from the center of rotation of the disks comprising levers fulcrumed on the main frame and pivotally connected with the hub portions of the rollers, lever actuating mechanism, and means for shifting the rollers laterally from disk to disk to reverse the mechanism.

8. In a double rolling power-transmitting mechanism, the combination of two parallel disks having confronting friction-faces, two transverse shafts between and parallel with said disk-faces, a roller on each of said transverse shafts disposed respectively on opposite sides of the center of rotation of said disks, means for shifting the rollers on their shafts simultaneously toward and away from the center of rotation of the disks comprising levers fulcrumed between their ends on the main frame and pivotally connected at the ends of their long arms with the hub-portions of the rollers, a sliding bar, links pivotally connecting the short arms of the said levers with said bar, and bar reciprocating mechanism and an operating handle therefor and means for shifting the rollers laterally from disk to disk to reverse the mechanism.

WILLIAM R. DONALDSON.
GEORGE W. MARBLE.

In the presence of—
W. B. DAVIES,
C. W. WASHBURNE.